(12) United States Patent
Sauer

(10) Patent No.: US 8,668,184 B2
(45) Date of Patent: Mar. 11, 2014

(54) DOUBLE SEAT VALVE AND SEALING OF A DOUBLE SEAT VALVE

(75) Inventor: Martin Sauer, Altisheim (DE)

(73) Assignee: Krones AG, Neutraubling (DE)

( * ) Notice: Subject to any disclaimer, the term of this patent is extended or adjusted under 35 U.S.C. 154(b) by 232 days.

(21) Appl. No.: 13/164,801

(22) Filed: Jun. 21, 2011

(65) Prior Publication Data

US 2011/0309285 A1 Dec. 22, 2011

(30) Foreign Application Priority Data

Jun. 21, 2010 (DE) .......................... 10 2010 030 300

(51) Int. Cl.
*F16K 1/00* (2006.01)
*F16K 15/00* (2006.01)
*E03B 1/00* (2006.01)
*F16K 1/20* (2006.01)
*F16K 1/44* (2006.01)
*F16J 15/02* (2006.01)

(52) U.S. Cl.
USPC . 251/332; 251/333; 137/614.11; 137/614.18; 277/644; 277/637

(58) Field of Classification Search
USPC .......................... 251/332, 333, 356, 357, 358; 137/614.11, 614.18; 277/351, 353, 277/435, 438, 440, 441, 491, 497, 551, 589, 277/630
See application file for complete search history.

(56) References Cited

U.S. PATENT DOCUMENTS

| 3,149,848 | A | | 9/1964 | Galloway |
| 3,544,066 | A | * | 12/1970 | Fawkes .......................... 251/306 |
| 3,918,726 | A | | 11/1975 | Kramer |
| 4,113,268 | A | * | 9/1978 | Simmons et al. .............. 277/641 |
| 4,915,355 | A | * | 4/1990 | Fort ............................... 251/357 |
| 6,202,983 | B1 | * | 3/2001 | Hartman et al. ............... 251/306 |
| 7,513,483 | B1 | * | 4/2009 | Blume ........................... 251/332 |

FOREIGN PATENT DOCUMENTS

| CN | 101305227 A | 11/2008 |
| DE | 2503807 A1 | 7/1975 |
| DE | 29818551 U1 | 2/1999 |
| DE | 20205467 U1 | 8/2002 |
| DE | 10147455 C1 | 4/2003 |
| DE | 202006004173 U1 | 10/2006 |
| EP | 0711940 A1 | 5/1996 |
| EP | 1730430 A1 | 12/2006 |
| WO | WO-2005098287 A1 | 10/2005 |

OTHER PUBLICATIONS

Search Report for DE102010030300.3 dated Oct. 12, 2010.

* cited by examiner

*Primary Examiner* — John Rivell
*Assistant Examiner* — Hailey K Do
(74) *Attorney, Agent, or Firm* — Leydig, Voit & Mayer, Ltd.

(57) ABSTRACT

A double seat valve having a seat for cooperation with two valve disks which are linearly adjustable relative to each other and together relative with respect to the seat, for a seat valve function and a sliding valve function, each of the valve disks containing a ring seal with an elastic sealing ring in a ring groove, both sealing rings being manufactured with the same shapes and dimensions, each sealing ring being positioned in the ring groove with a backup ring, and both sealing rings being arranged in rotational positions differing with respect to the respective sealing function relative to the direction of adjustment of the valve disks.

22 Claims, 2 Drawing Sheets

DOUBLE SEAT VALVE AND SEALING OF A DOUBLE SEAT VALVE

CROSS-REFERENCE TO RELATED APPLICATION

The present application claims the benefit of priority of German Application No. 102010030300.3, filed Jun. 21, 2010. The entire text of the priority application is incorporated herein by reference in its entirety.

FIELD OF THE DISCLOSURE

The disclosure relates to a double seat valve as well as to a sealing of the type such as used in product processing, for controlling the flow of beverage, food, pharmaceutical or biotechnical product.

BACKGROUND

In the double seat valve known from EP 1 730 430 A, the two valve disks have ring grooves having different cross-sections and different ring seals in the ring grooves. In the one-piece valve disk providing a seat valve function, an integrally formed sealing ring of a trapezoidal shape in its cross-section is incorporated such that its external sealing zone is oriented approximately axially and towards the other valve disk. In the ring groove of the valve disk providing a sliding valve function, a composite ring seal is arranged which consists of an elastic sealing ring having an essentially C-shaped cross-section and a metallic backup ring having an approximately T-shaped cross-section and being connected with the sealing ring by vulcanization in a material connection. The two sealing rings at least have different shapes and dimensions. Parts of the valve disk which are screwed together axially support themselves at the vertical web of the T-cross-section of the backup ring. The sealing ring for the sliding valve function has an essentially radially oriented external sealing zone and another central sealing zone adjacent to it which is essentially oriented axially. Due to the two sealing zones, the preload frictional connection of the sealing ring in the ring groove is defined such that in the dynamic sealing function, one cannot reliably exclude that anything will get behind the sealing ring in the ring groove. Moreover, the composite ring seal is complicated and expensive to manufacture, and when the sealing ring is replaced, the backup ring must be replaced, too. The provision of two different ring seals for the double seat valve involves additional logistic efforts. The assembly of the sealing ring for the seat valve function is difficult, involves extreme deformation and the risk of product getting behind the sealing ring and the seal being torn out. As in the closed position of the valve disk responsible for the seat valve function there is no clear metallic stop of the valve disk under extreme process conditions, extreme and varying loads on the sealing ring result. The sealing rings are expendable parts that have to be replaced when the sealing effect is reducing.

In a double seat valve known from DE 101 47 455 C of another type, that is with two valve disks having the same diameters but only providing a sliding valve function each, the same ring seals are mounted in the two valve disks each for an exclusively radial sealing effect. The two valve disks consist of at least two parts. The screwed parts together limit the ring groove for the ring seal. Each ring seal consists of three components, that is a dimensionally stable backup ring having a C-shaped cross-section, a restoring ring of an elastic material positioned in the backup ring, for example an O-ring, and the sealing ring consisting of elastic material, which has a C-shaped cross-section and is placed onto the backup ring such that it can be exchanged. As the backup ring is only radially supported at at least one part of the valve disk, but the parts of the valve disk are mutually clamped so as to contact each other, the clamping width of the ring groove responsible of the preload form-fit of the sealing ring in the ring groove is inappropriately influenced by inevitable manufacturing tolerances of the parts of the valve disk, so that within one series of valve disks, different preload frictional connections of the sealing rings cannot be excluded. For an easier assembly, the backup ring can be assembled from segments. Between the sealing ring and the restoring ring as well as the backup ring, in a dynamic sealing function of the sealing ring in the seat, inevitable relative motions with locally concentrated friction and stress occur which endanger the service life of the sealing ring and the sealing function.

SUMMARY OF THE DISCLOSURE

One aspect of the disclosure is to provide a double seat valve of the type mentioned in the beginning which can be manufactured at low costs, easily mounted and is fail-safe, and to provide a universal seal of a double seat valve.

As the sealing rings are manufactured with the same shapes and dimensions, each sealing ring can be mounted in each valve disk, so that there is no risk of confusion. The sealing rings for the respective double seat valve or a series of double seat valves can be manufactured in the same production mold, which is inexpensive, among other things due to higher piece numbers, and minimizes logistic problems. Each of the identical sealing rings is positioned in the ring groove with the backup ring embodied corresponding to the respective sealing function, such that in the double seat valve, clearly defined dynamic and static sealing functions are ensured. In the double seat valve, the two sealing rings are arranged with rotational positions relative to the direction of adjustment of the valve disks that differ with respect to the respective sealing function. Due to the fact that the backup ring can be inserted without being confused and the ring grooves are designed for the different backup rings, the correct assembly position of the ring seal results in each case, without having to pay particular attention to the correct selection of a sealing ring when these expendable parts are replaced.

Despite different sealing functions of the two valve disks, the inventive sealing of the double seat valve can do with one sealing ring type which, also thanks to its universally extended field of application, makes it possible to reduce costs, logistic problems and risks of confusion during replacement and first assembly, and which in a clearly defined manner fulfills each of the two sealing functions with the different backup rings.

According to the disclosure, in the double seat valve, the two sealing rings are, in addition to the different rotational positions in the two valve disks, combined with backup rings of different effective diameters which are correspondingly adapted to the respective sealing function (essentially axial sealing function of a seat valve on a larger diameter, essentially radial sealing function of a sliding valve on a smaller diameter) and which are different, as also are the ring grooves in the two valve disks which optionally have identical cross-sections but different orientations. The elasticity of the sealing rings having the same shapes and dimensions easily permits to combine any sealing ring with any backup ring.

According to the disclosure, each sealing ring furthermore comprises at least one external sealing zone projecting from the ring groove, the sealing ring is arranged, for the radial sealing function, in a multi-piece valve disk in a rotational position with an external sealing zone approximately oriented radially and outwards, and the sealing ring is arranged, for the at least essentially axial sealing function, in the other valve disk, also being a multi-piece valve disk, in a rotational position in which the external sealing zone is oriented axially and radially at an angle smaller than 90° obliquely to the direction of adjustment and towards the one valve disk. The angle is preferably approximately 30°.

In one preferred embodiment, each backup ring comprises a base part to be fixed between parts of the valve disk as well as a backup part that can be introduced internally into the sealing ring at least with a positive fit. The base parts of both backup rings can have different shapes and/or dimensions, for example be adapted to the respective assembly conditions in the valve disk. In contrast, the backup parts of the backup rings intended for cooperation with the sealing ring can be preferably designed with identical cross-sections.

According to the disclosure, the backup part of the one backup ring extends perpendicularly away from the base part, while the backup part of the other backup ring type extends obliquely away from the base part at an angle. The backup rings are parts that can be easily and inexpensively manufactured, for example of metal or of a harder material than that of the sealing ring.

With respect to the fact that the same type of sealing ring is used in both valve disks, it is suitable for the ring grooves in both valve disks to have at least essentially identical cross-sections. Provided that the backup parts of the backup rings are identical, the two sealing rings in this manner have the same preload frictional connections in both ring grooves, which is important for clearly defined static, and optionally dynamic, sealing functions.

Sealing rings are preferred which do not only have the same shapes and dimensions, but also similar elasticities.

With respect to the fact that one applied sealing ring is optionally expanded to a greater extent than the other one in the circumferential direction on the backup ring, the sealing rings produced with the same shapes and dimensions and optionally in the same mold could have the same or different elasticities, preferably the same or different Shore hardnesses, and/or consist of different elastomer or rubber materials to facilitate the application.

Furthermore, the sealing ring could be manufactured by multi-injection molding technology in one piece with zones of different Shore hardnesses and/or of different materials. The zones or materials could, for example, be adapted to a dynamic sealing function in the seat or a static sealing function in the ring groove of the valve disk.

In one suitable embodiment of the disclosure, each sealing ring has, in its essentially C-shaped cross-section, two outer sides which can have the same cross-sections and preferably have an increasing thickness towards their free ends. The external sealing zone, suitably designed like a roof, is formed between the outer sides. At the inner surface, adjacent to the outer sides, one ring groove each is provided, while between the ring grooves, at least one annular ring projecting to the inside is included. The outer sides are essentially responsible for the static sealing function of the sealing ring in the ring groove, while the external sealing zone is responsible for the dynamic sealing function, by interaction with the annular ring and the backup ring. The integrally formed annular ring fulfills the function of a restoring region and is suitably directly adjacent to the dynamically active external sealing zone.

To have a relatively large backup ring base part for a perfect positioning of the backup ring, it can be suitable for the ring grooves of the backup part of the backup ring to be offset inwards with respect to the base part via external shoulders. The size of the backup part at the base part, however, is adapted to the sealing ring, which can have a relatively small cross-section, i.e. consist of relative little elastic material. The external shoulders furthermore permit to limit clearances in the ring groove in which the outer sides of the sealing ring can expand or contract, for example due to temperature and/or swelling. The little material or the relatively small cross-section of the sealing ring offers advantages in view of a smaller swelling volume in case of a contact with media, and a smaller volumetric expansion in case of changes in temperature.

To minimize the mechanical stress while the sealing ring is being placed onto the backup ring and/or to facilitate assembly, the backup ring can be divisibly embodied from ring segments. In the mounted position, the backup ring anyway becomes an effectively integral backup ring due to the clamping between the parts of the valve disk. As the expansion of the sealing ring during the application is anyway moderate, single-piece backup rings can also be used.

Due to the preload frictional connection clearly defined between the ring groove limited by the parts of the valve disk and the backup ring, and due to the easy assembly without excessive deformations of the sealing ring, the latter can have a Shore hardness of about 85 Shore. This relatively high degree of hardness minimizes the risk of any matter getting behind the sealing ring in the ring groove and contributes to an increased service life of the sealing ring.

Suitably, the sealing ring is replaceably attached on the backup ring so that the backup ring can be still used when the sealing ring is replaced. However, this does not exclude to alternatively connect the sealing ring in a material connection with the backup ring and to replace both components together.

In one suitable embodiment, the valve disks comprise, at their sides facing each other, dimensionally stable stop faces that can be brought into mutual abutting contact. As an alternative or in addition, a surrounding dimensionally stable sealing bead can be provided at one valve disk at a side facing the other valve disk, where the sealing bead can be brought into an at least essentially axial central sealing engagement with the external sealing zone of the sealing ring arranged in an oblique rotational position in the other valve disk. When the stop faces and the sealing bead are combined, the abutting contact in an exactly reproducible manner defines the extent of the central sealing engagement, so that an entry or exit of media into or out of the leakage space thus hermetically enclosed between the two valve disks is avoided.

A particularly important idea of the disclosure is that the parts of the valve disk defining the ring groove are supported from two sides at the backup ring essentially in the direction of adjustment of the valve disks with a positive and a non-positive fit, so that the backup ring defines the clamping width of the ring groove generating a preload frictional connection for the sealing ring in the ring groove via this support of the parts. This function of the backup ring prevents that inevitable manufacturing tolerances of the relatively large parts of the valve disk have a negative effect on the precision of the clamping width of the ring groove.

In addition or as an alternative, it can be furthermore suitable for the backup ring to define the radial position of the sealing ring generating a projection of the external sealing zone of the sealing ring over the ring groove of the valve disk, e.g. by a radial positive support at at least one part of the valve disk. The radial support of the backup ring excludes a yielding of the backup ring under extreme loads, which would endanger the sealing functions of the sealing ring.

Another important aspect of the disclosure finally consists in that the ring ribs engaging in the ring grooves of the sealing ring functionally separate, at the backup part of the backup ring, static sealing regions of the sealing ring in the ring groove from at least one dynamic sealing region of the sealing ring in the seat of the valve chamber. The static sealing region provides a sealing function in the ring groove to prevent anything from getting behind the sealing ring and to prevent the sealing ring from being torn out, while the dynamic sealing region has to provide the sealing function in the seat in which the sealing ring is subjected to deformations at least in some regions. By the separation of the functions via the ring ribs of the backup part, the actually contrary sealing functions of the sealing ring cannot mutually affect each other.

BRIEF DESCRIPTION OF THE DRAWINGS

With reference to the drawing, one embodiment of the subject matter of the disclosure will be illustrated. In the drawings.

DETAILED DESCRIPTION OF THE PREFERRED EMBODIMENT

Figure 1:
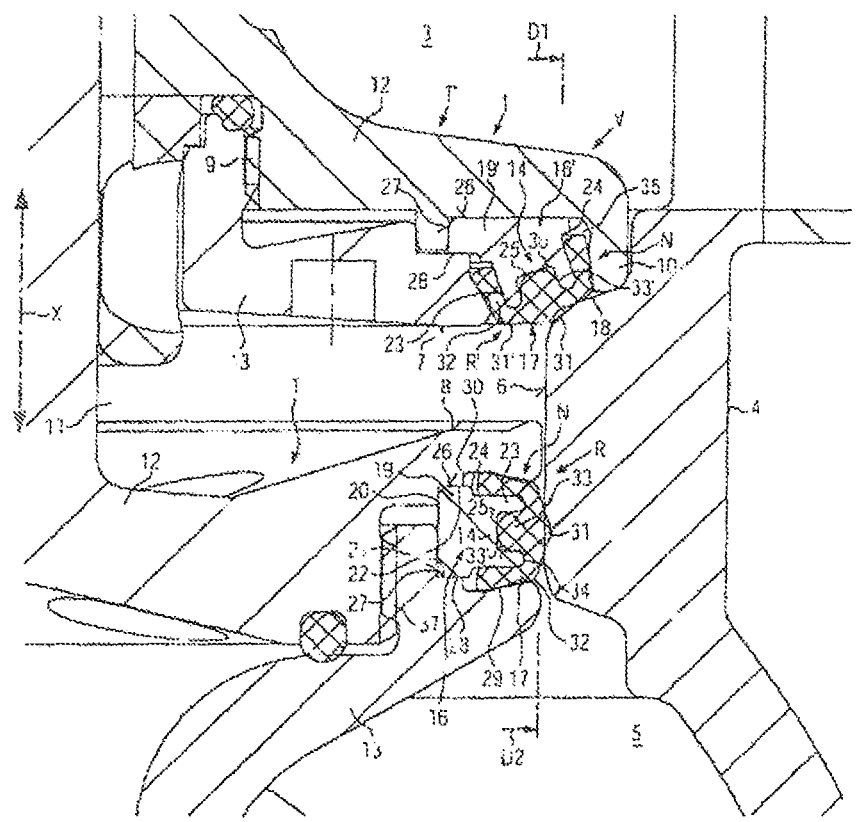
FIG. 1 shows a partial axial section of a double seat valve in a closed position with the illustration of a sealing of the double seat valve.
Figure 2:
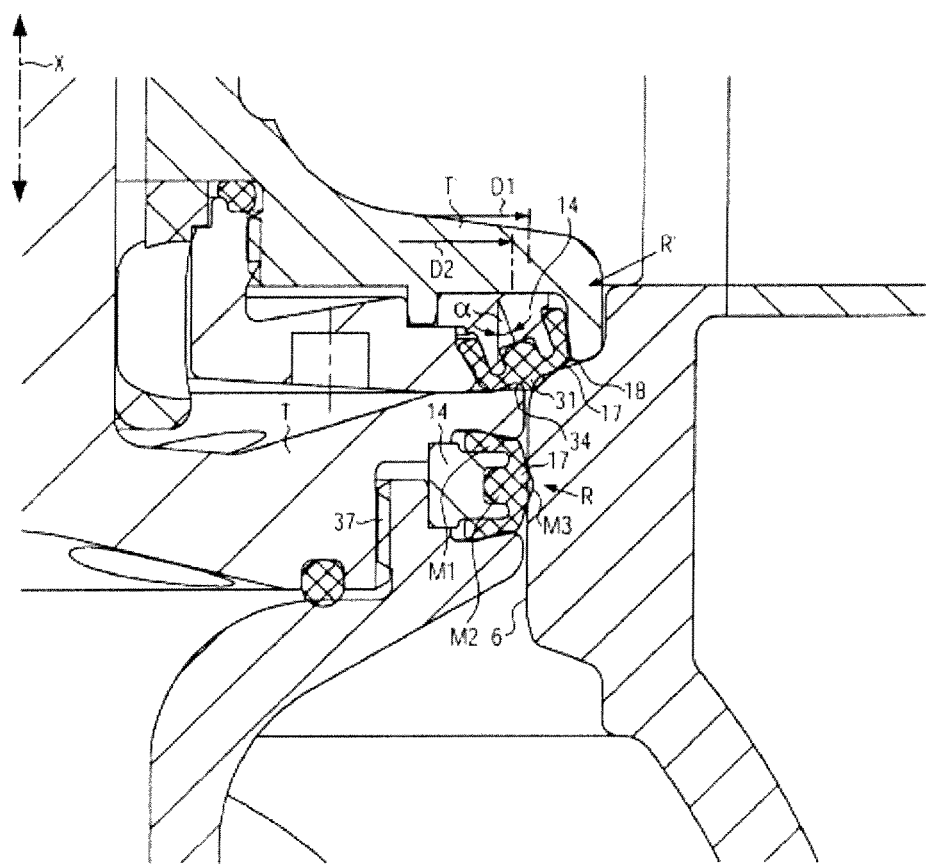
FIG. 2 shows a sectional view to FIG. 1, for example in a phase just before the closed position of the double seat valve is left.

Double seat valves V according to FIGS. 1 and 2 with two valve disks T, T' cooperating together with a seat 6 in a chamber 4 of the double seat valve V for a combination of a seat valve function 1 and a sealing valve function 2 are used, for example, for the flow control for beverages, food, pharmaceutical or biotechnical products. It must be optionally possible to externally and/or internally clean such double seat valves in a special way, they have to reliably isolate flow paths 3, 5 from each other in the closed position (FIG. 1) and avoid a leakage exchange between the flow media, and exclude a media exchange between the flow paths 3, 5 in cleaning cycles.

FIG. 1 is a portion of an axial section of the double seat valve V in the closed position. The upper and the lower valve disks T', T each consist of two parts 12, 13 which are clamped against each other and each against a dimensionally stable backup ring 16, 16' of a ring seal R, R' in a ring groove N via threaded joints 9, 37. The upper valve disk T' provides the seat valve function 1 with an axial and radial sealing at a here conical sealing surface 18 in the seat 6, while the lower valve disk T provides, with its ring seal R, the sliding valve function 2 with an only radial sealing in the seat 6. The upper valve disk T' could here, for example, even comprise a merely axially acting ring seal R' (not shown). Due to a metallic contact of an edge 10 of the part 12 at the sealing surface 18 in the closed position, the valve disk T' can assume an exactly defined sealing position.

With reference to FIGS. 1 and 2, for such a double seat valve V or its sealing, the concept of the employed ring seals R, R' will be illustrated. It should be pointed out that, though the ring seals R, R' comprise differently designed backup rings 16, 16, the sealing rings 17 attached to them have been manufactured with the same shapes and dimensions (one common type of sealing ring), i.e. in the same manufacturing mold, but are placed on the backup ring 16, 16' in different rotational positions.

The backup ring 16 used in the lower valve disk T has a broadened base part 19 which is limited at three sides by orthogonally adjacent surfaces 20, 21, 22 and is mounted in the valve disk T in such a way that stop faces 26 and 28 of the parts 12, 13 of the valve disk T are pressed by the threaded joint 37 from two opposite axial sides (that means in the direction of adjustment X) against the surfaces 20, 22 of the base part 19. In this manner, the backup ring 16 defines the clamping width between sides 29 of the ring groove N over the width of its base part 19, the clamping width generating a predetermined preload frictional connection for the sealing ring 17. Preferably, the backup ring 16 furthermore supports itself with the surface 21 radially at a cylindrical stop surface 27, here the part 13, so that the backup ring 16 also defines the radial position of the sealing ring 17 which generates a fixed protrusion of an outside external sealing zone 31 of the sealing ring 17 over the valve disk T (for the here radial sealing function).

Two at least essentially parallel ring ribs 23 extend from the base part 19 over external shoulders 24 perpendicularly and offset to the inside at a backup part 14 of the backup ring 16, which ring ribs include between them an indentation 25 in the form of a rounded or approximately rectangular ring groove. The sealing ring 16 positioned in the lower valve disk T by the backup ring 16 has an approximately C-shaped cross-section, consists of an elastic material, such as an elastomer or rubber, and has two approximately parallel outer sides 32 which are fixed between inner flanks 29 of the ring groove N and on the ring ribs 23 of the backup part 14 of the backup ring 16 with the predetermined preload frictional connection. The outer sides 32 here have the shape of a wedge, for example. Ring grooves 34 are shaped into the sealing ring 17 internally adjacent to the outer sides 32 and include between them at least one annular ring 33' projecting inwards which is made of the material of the sealing ring 17 and in one piece with the latter and defines a restoring region 33 which is effectively inserted between the indentation 25 and the external sealing zone 31 and imparts a certain dynamic sealing or deformation characteristic to it.

The backup ring 16' in the upper valve disk T' in FIGS. 1 and 2 differs from the backup ring 16 in the lower valve disk T in that the base part 19' is fixed with its orthogonal adjacent surfaces between the stop faces 26, 28 of the parts 12, 13 axially, and optionally at one stop face 27 also radially, where the base part 19' here essentially extends radially. The backup part 14 can have the same cross-section as the backup part 14 of the other backup ring 16. The ring ribs 23 here lead away from the base part 19' in the backup part 14, however at an oblique angle α. The ring groove N between the two parts 12, 13 can have the same cross-section as that in the lower valve disk T, however it is also inclined by the angle α to generate, via the sealing ring 17, a radial and axial sealing at the conical sealing surface 18. The clamping width of the ring groove N is also defined in the upper valve disk T' by the backup ring 16' and by the support of the parts 12, 13 at the base part 19', i.e. here, too, there is a defined preload frictional connection of the sealing ring 17 in the ring groove N as well as a defined protrusion of the external sealing zone 31.

In the ring seal R' (this is also true for the ring seal R in the lower valve disk T) in the upper valve disk T', clearances 36 are defined adjacent to the annular ring 33', and/or clearances 35 between the base part 19' or 19, respectively, and the parts 12, 13 for the free ends of the outer sides 32. These clearances 36 and/or 35 permit expansions and contractions of the sealing ring 17 due to temperature and/or swelling.

The lower valve disk T has, at the edge at the top of its part 12, a surrounding sealing bead 34 which is intended for cooperation with a further external sealing zone 31' or a portion of the external sealing zone 31 of the sealing ring 17 in the upper valve disk T', when the double seat valve V is brought from the closed position shown in FIG. 1 to the open position by a non-depicted drive device, where (FIG. 2), before the upper valve disk T' is lifted, first the lower valve disk T is lifted to such an extent that the sealing bead 34 acts at the sealing ring 17 in the upper valve disk T' in a sealing manner and, during the subsequent lifting of the upper valve disk T' from the conical sealing surface 18, no medium can flow from a flow path 3, 5 into the space (leakage space 11) between the valve disks T, T' or out of it. In addition, stop faces 7, 8 can be provided at the valve disks T, T' in certain relative positions to the sealing bead 34 and the external sealing zone 31 or 31' of the sealing ring 17 in the upper valve disk T', which come into abutting contact in the valve position of FIG. 2 and define a precise, in each case exactly reproducible sealing function between the sealing bead 34 and the external sealing zone 31 or 31'.

From the entrainment position in FIG. 2, the upper valve disk T' is then entrained via the axial abutting contact of the stop faces 7, 8 by the lower valve disk T into the non-depicted open position of the double seat valve V in which both valve disks T, T' have exited from the seat 6.

FIG. 2 indicates, as a possible variant, that the respective sealing ring 17 has different Shore hardnesses or/and elasticities or/and materials in zones M1, M2, M3, however has been produced in one piece, for example by multi-injection molding technology. Zones M1, M2, M3 can be adapted to different sealing functions (static and/or dynamic). Basically, a Shore hardness of about 85 Shore can be selected for the sealing ring 17, independent of whether it is mounted in the upper valve disk T' or in the lower valve disk T, because the assembly of the ring seal R, R' is simple and does not require any excessive deformations of the sealing ring 17. This relatively high Shore hardness of the sealing ring 17 minimizes, when the ring seal R, R' is mounted, the risk of anything getting behind the sealing ring in the ring groove N and contributes to the stability, pull out resistance and wear resistance of the sealing ring 17.

As mentioned, according to the disclosure, sealing rings 17 having the same shapes and dimensions and which can be manufactured in one and the same production mold are suitably placed optionally onto the backup ring 16' or the backup ring 16. As the difference between the effective diameters D1, D2 is small, the sealing rings 17 can be used with the same shapes and dimensions and with the same Shore hardnesses for both backup rings 16, 16'. With respect to the fact that the sealing ring 17 placed on the backup ring 16' with the larger effective diameter D1 than the effective diameter D2 of the backup ring 16 must be expanded somewhat more in the circumferential direction and placed in a rotated manner, the sealing ring 17 for the backup ring 16' manufactured in one and the same mold can optionally be designed with a somewhat lower Shore hardness and thus higher elasticity. To facilitate assembly and to avoid extreme deformations of the sealing ring 17 while it is being placed, the backup ring 16, 16' can consist of at least two segments which are individually inserted from inside into the sealing ring 17 and joined in it. As an alternative, the backup ring 16, 16' consists of one piece.

The at least one annular ring 33' projecting inwards between the ring grooves 34 of the sealing ring 17 forms a restoring region 33 of the ring seal 17 which is inserted, effectively and for a dynamic sealing function of the external sealing zone 31, between the base of the indentation 25 and the ring ribs 23 of the backup part 14 of the backup ring 16, 16' and the external sealing zone 31. This integrally formed restoring region 31 defines, for example, the dynamic deformation and sealing characteristic of the external sealing zone 31, which in the selected embodiment of the sealing ring 17 for example has a roof-like design, but could also have another surface structure. When the lower valve disk T is shifted in the seat 6, and when it submerges in or emerges from the seat 6, the restoring region 33 mainly creates the radial pressing of the external sealing zone 31 to the inner wall of the seat 6, where it is supported at the base of the indentation 25 and between the ring ribs 23 at the backup ring 16, while the ring ribs 23 absorb forces acting in the ring grooves 34 in the direction of adjustment X. The outer sides 32 which only provide the static sealing function inside the ring groove N are kept clear from such deformations. This is also true for the upper ring seal R' in FIGS. 1 and 2, in which the backup ring 16' takes care of the functional separation of the sealing and working functions of the ring seal 17 when the external sealing zone 31 cooperates with the conical sealing surface 18, or with the sealing bead 34 of the lower valve disk T. By means of the backup ring 16 and 16', respectively, and its clamping between the parts 12, 13 of the valve disk T, T', in combination with the integration of the restoring region 33 into the ring seal 17, a clearly defined functional separation of the static and dynamic sealing functions of the ring seal 17 during the operation of the double seat valve V is achieved. The combination of the backup ring 16, 16' with the sealing ring 17 finally advantageously permits to use relatively little material in the cross-section of the sealing ring 17, whereby in particular the benefit of the swelling of the material in case of a contact with media and its expansion at higher temperatures being restricted shows to advantage.

The invention claimed is:

1. A double seat valve, in particular for the flow control of beverages, food, pharmaceutical or biotechnical products, the double seat valve comprising:
   at least one seat, disposed in a valve chamber between flow paths, the at least one seat including sealing surfaces;
   first and second valve disks configured to cooperate with the sealing surfaces of the at least one seat, the first and second valve disks being linearly adjustable relative to each other and relative to the at least one seat in a direction of adjustment,
   the first valve disk comprising a ring groove and a first ring seal with a first elastic sealing ring fixed in the respective ring groove with a preload frictional connection, the first ring seal being configured to generate an at least essentially axial sealing function, the first sealing ring being attached to a respective first dimensionally stable backup ring in the respective ring groove of the first valve disk, the first backup ring including:
   a base part fixed between parts of the first valve disk, and
   a backup part introduced into the respective first sealing ring at least with a positive fit and extending obliquely away from the base part at an angle (α);
   the second valve disk comprising a ring groove and a second ring seal with a second elastic sealing ring fixed in the respective ring groove with a preload frictional connection, the second ring seal being configured to generate an essentially radial sealing function in the seat, the second sealing ring being attached to a respective second dimensionally stable backup ring in the respective ring groove of the second valve disk, the second backup ring including:
   a base part fixed between parts of the second valve disk, the base part of the second backup ring having at least one of a different shape or different dimensions than the base part of the first backup ring, and a backup part introduced into the respective second sealing ring at least with a positive fit and extending perpendicularly away from the base part, wherein the first and second sealing rings are manufactured with the same shapes and dimensions as one another, and wherein the first and second sealing rings are arranged in rotational positions differing with respect to the respective sealing function relative to the direction of adjustment.

2. The double seat valve according to claim 1, wherein the first and second sealing rings have different effective diameters and are arranged at the respective backup rings with different preloads in circumferential directions.

3. The double seat valve according to claim 1, wherein the respective ring grooves in both of the first and second valve disks have substantially identical cross-sections.

4. The double seat valve according to claim 1, wherein each sealing ring is integrally manufactured by multi-injection molding technology with zones of different Shore hardnesses and/or different materials.

5. The double seat valve according to claim 1, wherein with each ring seal being mounted in the respective valve disk, open alternative spaces are provided in at least one of an indentation opposite the backup ring or between the backup ring and the parts of the respective valve disk lying against the backup ring.

6. The double seat valve according to claim 1, wherein the backup ring is embodied in one piece or divisibly from ring segments.

7. The double seat valve according to claim 1, wherein the sealing ring is attached on the backup ring so as to be replaceable.

8. The double seat valve according to claim 1, wherein each of the first and second valve disks comprise dimensionally stable stop faces on respective sides of the valve disks that are facing one another, the stop faces being configured to be brought into mutual abutting contact, and the second valve disk including a surrounding, dimensionally stable sealing bead configured to provide a defined, axial sealing engagement with an external sealing zone of the first sealing ring.

9. The double seat valve according to claim 1, wherein each of the first and second sealing ring comprises a respective external scaling zone projecting from the respective ring groove, the second sealing ring being arranged, for the radial sealing function, within the parts of the second valve disk in a rotational position such that the respective external sealing zone is approximately radially oriented, and the first sealing ring being arranged, for the at least essentially axial sealing function, within the parts of the first valve disk in a rotational position in which the respective external sealing zone is oriented axially and radially at an angle (n) smaller than 90°, obliquely to the direction of adjustment and towards the second valve disk.

10. The double seat valve according to claim 9, wherein the angle, ($\alpha$) is approximately 30°.

11. The double seat valve according to claim 1, wherein the first and second sealing rings have at least one of different elasticities or comprise different elastomer or rubber materials.

12. The double seat valve according to claim 11, wherein the two sealing rings are of the same Shore hardnesses.

13. The double seat valve according to claim 11, wherein the two sealing rings are of different Shore hardness.

14. The double seat valve according to claim 1, wherein each sealing ring comprises: a C-shaped cross-section including two outer sides which become thicker towards their free ends, an external sealing zone disposed between the outer sides, a ring groove disposed internally adjacent to each of the outer sides, and at least one annular ring projecting inwards between the ring grooves.

15. The double seat valve according to claim 14, wherein the base part of each backup ring is limited by orthogonal surfaces, and the backup part of each backup ring includes two spaced apart ring ribs fitting into the ring grooves of the respective sealing ring, the respective ring ribs of each back up part being at least essentially parallel, and including an indentation embodied as a ring groove disposed between the ring ribs.

16. The double seat valve according to claim 15, wherein the ring ribs of each backup part are offset to the inside with respect to the base part via external shoulders.

17. The double seat valve according to claim 15, wherein the backup ring is manufactured of metal or a harder material than that of the sealing ring.

18. The double seat valve according to claim 15, wherein the parts of the respective valve disk are supported at the backup ring from two sides in the direction of adjustment, and the backup ring defines, by the support of the pans, a clamping width of the ring groove generating a preload frictional connection for the sealing ring.

19. The double seat valve according to claim 18, wherein the ring ribs of the backup ring engaging in the ring grooves of the sealing ring functionally separate static sealing regions of the sealing ring in the ring groove from at least one dynamic sealing region of the sealing ring in the seat.

20. The double seat valve disk according to claim 18, wherein each backup ring defines the radial position of the respective sealing ring generating a protrusion of an external sealing zone over the respective ring groove of the respective valve disk.

21. The double seat valve according to claim 20, wherein the is defined over a radial positive support at at least one part of the valve disk.

22. Sealing of a double seat valve, in particular for the flow control of beverages, food, pharmaceutical or biotechnical products, comprising two valve disks, one valve disk providing, by means of at least one ring seal, an at least essentially radial sealing function, and the other valve disk providing, by means of at least one ring seal, an axial sealing function, and where at least one of the ring seals comprises an elastic sealing ring attached on a dimensionally stable backup ring, the two ring seals comprising sealing rings manufactured with the same shapes and dimensions at the backup rings designed differently with respect to their scaling functions.

* * * * *